US010759397B2

(12) United States Patent
Heindl et al.

(10) Patent No.: US 10,759,397 B2
(45) Date of Patent: Sep. 1, 2020

(54) VEHICLE DRIVE TRAIN BRAKING

(71) Applicant: AGCO International GmbH, Neuhausen (CH)

(72) Inventors: Richard Heindl, Marktoberdorf (DE); Sven Krieger, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 213 days.

(21) Appl. No.: 15/559,913

(22) PCT Filed: Mar. 22, 2016

(86) PCT No.: PCT/EP2016/056256
§ 371 (c)(1),
(2) Date: Sep. 20, 2017

(87) PCT Pub. No.: WO2016/150958
PCT Pub. Date: Sep. 29, 2016

(65) Prior Publication Data
US 2018/0072280 A1  Mar. 15, 2018

(30) Foreign Application Priority Data
Mar. 25, 2015  (GB) .................................. 1505029.7

(51) Int. Cl.
*F16H 48/36*  (2012.01)
*B60T 1/06*  (2006.01)
*B62D 11/18*  (2006.01)
(52) U.S. Cl.
CPC .............. *B60T 1/062* (2013.01); *B60T 1/065* (2013.01); *B62D 11/18* (2013.01); *F16H 48/36* (2013.01);
(Continued)

(58) Field of Classification Search
CPC ................................ B62D 11/06; B62D 11/02
See application file for complete search history.

(56) References Cited

U.S. PATENT DOCUMENTS 3,618,686 A * 11/1971 Morsbach .............. B62D 11/10
180/6.7
7,755,309 B2 * 7/2010 Gebert ..................... B60K 6/48
318/139

(Continued)

FOREIGN PATENT DOCUMENTS

DE   10 2005 032196 A1   1/2007
DE   10 2006 059591 A1   6/2008
(Continued)

OTHER PUBLICATIONS

UK Intellectual Property Office, International Search Report for priority UK Application No. 1505029.7, dated Sep. 24, 2015.
(Continued)

*Primary Examiner* — Derek D Knight

(57) ABSTRACT

A drive train arrangement for a tracked or two-wheel drive utility vehicle including a transmission and differential axle. The transmission has on a first side a rotatably driven input adapted to couple to the output of a motive power unit of the vehicle, and on a second side opposed to the first, an output shaft. The differential axle unit, which may be a steering differential, has an input coupled with the transmission unit output shaft and a pair of output shafts operationally coupled with the input via a plurality of planetary gear sets. The transmission unit output shaft extends outwardly of the unit also on the first side, and has a vehicle brake assembly mounted to the output shaft on the first side.

7 Claims, 2 Drawing Sheets

(52) U.S. Cl.
CPC .. *F16H 2048/364* (2013.01); *F16H 2048/368* (2013.01)

(56) References Cited

U.S. PATENT DOCUMENTS

| | | | | |
|---|---|---|---|---|
| 2003/0114263 | A1* | 6/2003 | Inoue | B60T 1/062 |
| | | | | 475/198 |
| 2007/0095584 | A1* | 5/2007 | Roske | B60K 6/387 |
| | | | | 180/65.285 |
| 2010/0044129 | A1 | 2/2010 | Kyle | |

FOREIGN PATENT DOCUMENTS

| | | |
|---|---|---|
| DE | 10 2010 046048 A1 | 3/2012 |
| DE | 10 2011 005531 A1 | 9/2012 |
| EP | 1375970 B1 | 10/2008 |
| FR | 2520689 A1 | 8/1983 |
| FR | 2968607 A1 | 6/2012 |
| JP | 2007216746 A | 8/2007 |
| WO | 2008/015048 A1 | 2/2008 |
| WO | 2008122862 A1 | 10/2008 |
| WO | WO-2008122862 A1 * | 10/2008 ............... B60K 6/36 |
| WO | 2009/010819 A1 | 1/2009 |
| WO | 2011/073596 A2 | 6/2011 |

OTHER PUBLICATIONS

European Patent Office, International Search Report for Parent International Patent Application No. PCT/EP2016/056256, dated Jul. 11, 2016.

\* cited by examiner

VEHICLE DRIVE TRAIN BRAKING

BACKGROUND OF THE INVENTION

Field of Invention

The present invention relates to drive train arrangements for utility vehicles, such as self-propelled agricultural machines, and more particularly to braking arrangements for a tracked vehicle wherein a pair of rear stub axles drive respective left and right hand tracks of the vehicle and steering is accomplished through differential control of left and right track relative speeds.

Description of Related Art

An example of a drive train suited to a utility vehicle having two driven wheels or ground engaging members, such as a tracked agricultural tractor, is described in European patent EP 1 375 970 B1. The drive train comprises a transmission unit, a differential assembly, and first and second final drive assemblies. The transmission unit has on a first side a rotatably driven input adapted to couple to the output of a motive power unit of the vehicle, typically an internal combustion engine, and on a second side opposed to the first an output shaft. The differential assembly has an input coupled with the transmission unit output shaft and a pair of output shafts operationally coupled with the input via a plurality of planetary gear sets and each driving a respective wheel or ground engaging member through a respective final drive assembly.

A casing assembly for the drive train of EP 1 375 970 B1 includes connected transmission and differential housings within which is also provided a brake assembly between transmission housing and differential housing which is engageable with the transmission unit output shaft to provide additional braking capabilities to supplement service brakes acting on the differential output shafts. The brake assembly within the housings may serve as a parking brake for the vehicle.

Such an arrangement has a number of drawbacks. Firstly, in order to accommodate the braking assembly between them, the transmission unit and differential assembly cannot be close coupled which would otherwise be desirable to produce a compact drive train arrangement. Furthermore, positioning the transmission unit and differential assembly as close together as possible makes the space for the brake assembly very cramped, leading to problems when it comes to routine maintenance of the brake assembly, for example to replace worn brake disks. In the arrangement of EP 1 375 970 B1, it is required to physically separate the transmission unit and differential assembly in order to be able to access the brake assembly. Furthermore, if the braking capacity is to be increased, e.g. for an application in a vehicle with higher performance, the assembly of transmission and differential housing is impacted as more space is required for the brake assembly.

It is, therefore, an object of the invention to provide a drive train arrangement for a tracked or similar utility vehicle which addresses at least some of these drawbacks.

OVERVIEW OF THE INVENTION

In accordance with the invention there is provided a drive train arrangement for a two-wheel drive utility vehicle comprising:

a transmission unit having on a first side a rotatably driven input adapted to couple to the output of a motive power unit of the vehicle, and on a second side opposed to the first an output shaft;

a differential axle unit having an input coupled with the transmission unit output shaft and a pair of output shafts operationally coupled with the input via a plurality of planetary gear sets;

characterised in that the transmission unit output shaft extends outwardly of the unit also on the first side, and in that a vehicle brake assembly, operable as one or both of a service brake and a parking brake, is mounted to the output shaft on the first side.

With the vehicle brake assembly being mounted on a front side (face) of the transmission unit, rather than being sandwiched between transmission unit and differential, access to the brake assembly for maintenance purposes—e.g. to replace brake disks—is generally made easier. A drivetrain arrangement having a brake assembly on the first side of a transmission unit is shown in WO2008/122862A1. However, this is neither a service nor parking brake but is provided to lock an electric motor/generator in a hybrid drive train arrangement and, with the brake being sandwiched between the motor/generator and a clutch assembly, the access problems of EP 1 375 970 B1 are still present.

In the arrangement of the present invention, with the transmission input and vehicle brake assembly being effectively in parallel on the first side of the transmission, the overall length of the transmission and differential assembly may be made shorter than would be the case if the brake assembly were between them. Furthermore, the braking capacity can be easily enlarged by using space at the front face of the transmission unit without impacting the assembly of transmission unit and differential assembly.

The vehicle brake assembly may be provided by a hydraulically-released spring-applied multi-disk brake. In addition to the vehicle brake assembly on the transmission unit front face, the differential axle unit may comprise further service brakes on the respective output shafts.

The vehicle brake assembly may be mounted to a chassis of the vehicle or, more preferably, to a housing of the transmission unit. In this latter arrangement, the vehicle brake assembly may be provided with a cover attached to the transmission unit housing to provide a closed oil reservoir and to avoid the ingress of external contaminants.

The present invention also provides a utility vehicle, especially a tracked vehicle, including a drive train arrangement as recited above. In such a vehicle, wherein the differential axle unit is mounted backward of the transmission, side, front or bottom access to the vehicle brake assembly for maintenance thereof is preferably enabled when any cover over the vehicle brake assembly is removed.

BRIEF DESCRIPTION OF THE DRAWINGS

Further features and advantages of the invention will become apparent from reading the following description of specific embodiments with reference to the appended drawings in which:—

DETAILED DESCRIPTION OF THE INVENTION

Figure 1:
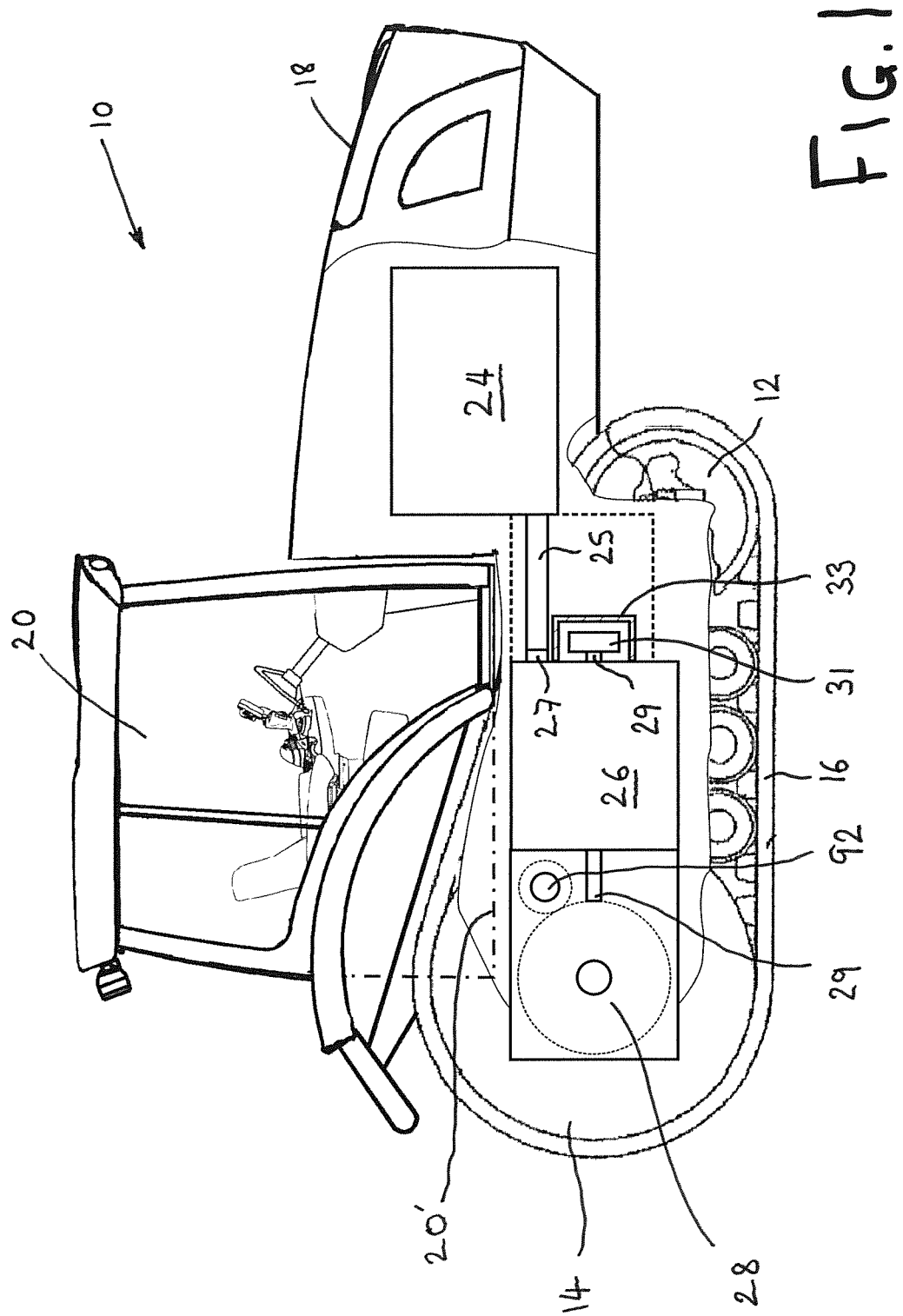
FIG. 1 is a schematic side elevational representation of a tracked agricultural tractor having a drive train arrangement driving the tracks thereof.

Referring initially to FIG. 1, an agricultural vehicle in the form of a tracked tractor 10 is shown having front idler wheels 12 and rear drive wheels 14 which together carry a track 16. The tractor 10 has an engine cover 18 and an operator cab 20 which is supported by a tractor chassis 22. An engine 24 (typically a diesel unit) provides motive power via a driveshaft 25 to a rotatably-driven input 27 on a first side of a transmission unit 26. From a second side (opposed to the first) of the transmission unit 26, an output shaft 29 couples the motive force to the input of a rear differential axle unit 28 which drives the tracks 16 through rotation of the rear drive wheels 14. The differential axle unit 28 also enables steering of the vehicle by differential control of the relative speeds of the tracks on the left and right hand sides of the tractor by means of a steering motor 92. As shown, the steering motor axis of rotation is parallel to that of the rear driven wheels 14 whilst being forward and above, such as to minimise front to rear length of the differential without increasing height enabling the differential to be mounted close below the floor of the operator cab 20, as represented by dashed line 20'.

The output shaft 29 of the transmission unit 26 also extends outwardly of the unit on the first side adjacent to the rotatably driven input 27. The output shaft 29 may be a single part extending outwardly on both sides of the unit 26 or, in an alternative embodiment, may consist of first and second drivingly connected output shaft portions, which portions may be coaxial or with a horizontal or vertical offset. The first output shaft portion may thereby extend on said first side of unit 26 for connection with a vehicle brake assembly 31 while the second output shaft portion couples to the input of differential axle unit 28 on said second side.

Mounted to (and operational to act upon) the output shaft 29 on the first side is the vehicle brake assembly 31. The vehicle brake assembly 31 may be mounted to the chassis 22 of the vehicle or, more preferably, to a housing of the transmission unit 26. In this latter arrangement, as shown, the vehicle brake assembly 31 includes cover 33 attached to the transmission unit housing to close the oil reservoir and avoid the ingress of external contaminants Access to the vehicle brake assembly for maintenance (when the cover 33 is removed) may be from the side, through a suitable aperture in one of the track assemblies, or between the tracks, or from the front or beneath. The vehicle brake assembly is a hydraulically actuated multi-disk brake unit providing service brake and park brake functionality.

Figure 2:
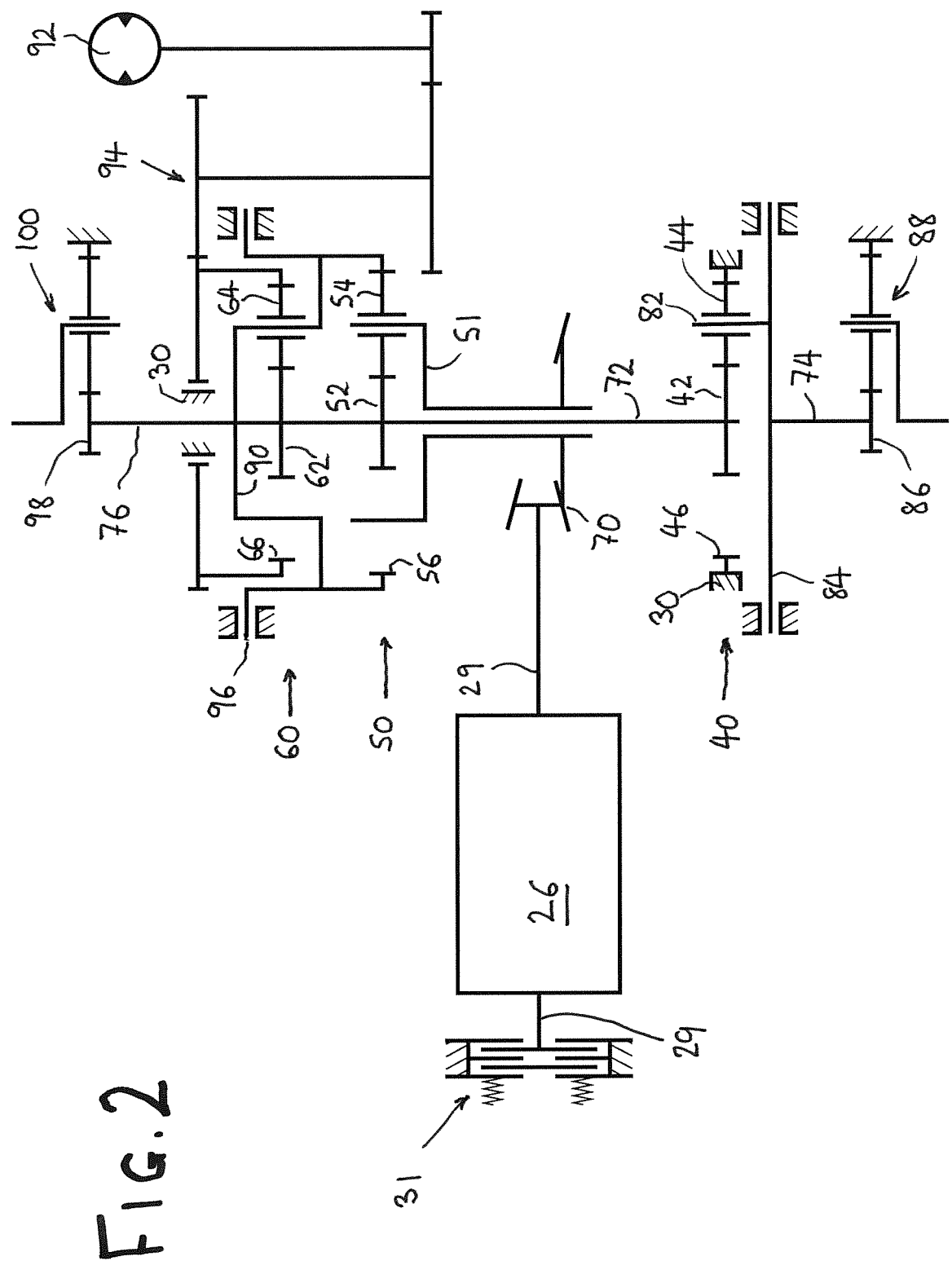
FIG. 2 schematically represents the interconnection of transmission and steering differential components in the drive train arrangement of FIG. 1.

FIG. 2 schematically represents the drivetrain components delivering motive power to the tracks and providing steering by means of the differential axle unit 28 of FIG. 1. The engine 24, driveshaft 25 and rotatably driven input 27 of the transmission unit 26 are omitted for reasons of clarity.

The rear differential 28 comprises a cast metal differential housing 30 encasing first (outer) 40, second (central) 50, and third (outer) 60 axially aligned planetary gear sets, each comprised of a central sun gear 42, 52, 62, three or more (depending on torque requirements) planetary gears 44, 54, 64 engaging the respective sun gear, and an outer ring gear 46, 56, 66 constraining and engaged by the respective planetary gears. The central planetary gear set 50 is mounted on a carrier 51 drivingly rotated about sun gear 52 by bevel gear arrangement 70 connected to output shaft 29 driven by the vehicle transmission unit 26.

The sun gears 42, 52, 62 of the three planetary sets are mounted on a common shaft 72 and rotate in unison. First 74 and second 76 output shafts extend through respective oil-seal bearings surrounding respective apertures in closing side walls of a central part of differential housing 30. The first one of the output shafts 74 is drivingly coupled to the planetary carrier 82 of one of the outer planetary gear sets 40, the ring gear 46 of which is fixed relative to the differential housing 30. This first output shaft 74 supports a service brake disk 84 for the vehicle before coupling to the sun gear hub 86 of a final reduction planetary gearing arrangement 88 coupled with a first one of the rear drive wheels 14. The second of the output shafts 76 is drivingly coupled to the planetary carrier 90 of the other of the outer planetary gear sets 60, the ring gear 66 of which is rotatably driven in forward or reverse direction by steering motor 92 acting through a reduction gearing 94. The planetary carrier 90 is further connected with a service brake disk 96 with the reduction gearing extending above the brake disk 96 and planetary gear sets 50, 60. The shaft 76 is coupled to the sun gear hub 98 of a final reduction planetary gearing arrangement 100 coupled with the other of the rear drive wheels 14. The service brakes 84, 96 of the differential supplement the brake assembly 31 on the front end of the transmission unit 26.

In the foregoing the applicants have described a drive train arrangement for a tracked or two-wheel drive utility vehicle which comprises a transmission unit 26 and differential axle unit 28. The transmission unit 26 has on a first side a rotatably driven input 27 adapted to couple to the output of a motive power unit 24 of the vehicle, and on a second side opposed to the first an output shaft 29. The differential axle unit 28, which may be a steering differential, has an input coupled with the transmission unit output shaft 29 and a pair of output shafts 74, 76 operationally coupled with the input via a plurality of planetary gear sets 40, 50, 60. The transmission unit output shaft 29 extends outwardly of the transmission unit 26 also on the first side, and has a vehicle brake assembly 31 mounted to the output shaft 29 on the first side.

From reading of the present disclosure, other modifications will be apparent to those skilled in the art. Such modifications may involve other features which are already known in the field of vehicle drive train systems and component parts therefore and which may be used instead of or in addition to features described herein.

The invention claimed is:

1. A drivetrain arrangement for a tracked vehicle comprising:
  left and right rear drive wheels;
  left and right front idler wheels;
  left and right tracks carried by the respective left and right rear drive wheels and left and right front idler wheels;
  a transmission unit having on a first side a rotatably driven input adapted to couple to the output of a motive power unit of the vehicle, and on a second side opposed to the first an output shaft;
  a differential axle unit having an input coupled with the transmission unit output shaft and a pair of output shafts operationally coupled with the input via a plurality of planetary gear sets, wherein a first one of the pair of output shafts is coupled with left rear drive wheel and a second one of the pair of output shafts is coupled with the right rear drive wheel, such that the differential axle unit is a steering differential and the pair of output shafts drive respective left and right tracks of the vehicle;
  wherein the transmission unit output shaft extends outwardly of the transmission unit also on the first side, and in that a hydraulically-actuated multi-disk brake vehicle brake assembly, operable as one or both of a service brake and a parking brake, is mounted to the output shaft on the first side.

2. The drive train arrangement as claimed in claim 1, wherein the vehicle brake assembly is mounted to a housing of the transmission unit.

3. A two-wheel drive utility vehicle including a motive power unit coupled with the drive train arrangement as claimed in claim 1.

4. The two-wheel drive utility vehicle as claimed in claim 3, wherein the motive power unit is mounted forward of the transmission unit, and side access to the vehicle brake assembly is enabled when a cover over the vehicle brake assembly is removed.

5. The two-wheel drive utility vehicle as claimed in claim 3, wherein the motive power unit is mounted above and forward of the transmission unit, and access to the vehicle brake assembly from the front or below is enabled when a cover over the vehicle brake assembly is removed.

6. A drive train arrangement, for a tracked vehicle comprising:
   left and right rear drive wheels;
   left and right front idler wheels;
   left and right tracks carried by the respective left and right rear drive wheels and d right front idler wheels;
   a transmission unit having on a first side a rotatably driven input adapted to couple to the output of a motive power unit of the vehicle and on a second side opposed to the first an output shaft;
   a differential axle unit having an input coupled with the transmission unit output shaft and a pair of output shafts operationally coupled with the input via a plurality of planetary gear sets, wherein a first one of the pair of output shafts is coupled with left rear drive wheel and a second one of the pair of output shafts is coupled with the right rear drive wheel such that the axle unit is a steering differential and the pair of output shafts drive respective left and right tracks of the vehicle;
   wherein the transmission unit output shaft extends outwardly of the transmission unit also on the first side, and in that a vehicle brake assembly operable as one or both of a service brake and a parking brake, is mounted to the output shaft on the first side, and wherein the differential axle unit comprises further service brakes on respective output shafts.

7. A drive train arrangement for a tracked vehicle comprising:
   left and right rear drive wheels;
   left and right front idler wheels;
   left and right tracks carried by the respective left and right rear drive wheels and left and right front idler wheels;
   a transmission unit having on a first side a rotatably driven input adapted to couple to the output of a motive power unit of the vehicle, and on a second side opposed to the first an output shaft;
   a differential axle unit having an input coupled with the transmission unit output shaft and a pair of output shafts operationally coupled with the input via a plurality of planetary gear sets, wherein a first one of the pair of output shafts is coupled with left rear drive wheel and a second one of the pair of output shafts is coupled with the right rear drive wheel such that the differential axle unit is a steering differential and the pair of output shafts drive respective left and right tracks of the vehicle;
   wherein the transmission unit output shaft extends outwardly of the transmission unit also on the first side, and in that a vehicle brake assembly, operable as one or both of a service brake and a parking brake, is mounted to the output shaft on the first side, wherein the vehicle brake assembly is mounted to a housing of the transmission unit and wherein the vehicle brake assembly has a cover attached to the transmission unit housing.

* * * * *